(12) United States Patent
Mazet et al.

(10) Patent No.: US 8,351,536 B2
(45) Date of Patent: Jan. 8, 2013

(54) WIRELESS COMMUNICATION OF DATA SYMBOLS

(75) Inventors: Laurent S. Mazet, Paris (FR); Sheng Yang, Meudon (FR)

(73) Assignee: Motorola Mobility LLC, Libertyville, IL (US)

( * ) Notice: Subject to any disclaimer, the term of this patent is extended or adjusted under 35 U.S.C. 154(b) by 962 days.

(21) Appl. No.: 12/208,483

(22) Filed: Sep. 11, 2008

(65) Prior Publication Data
US 2010/0061479 A1 Mar. 11, 2010

(51) Int. Cl.
*H04L 27/00* (2006.01)
(52) U.S. Cl. ..................................................... 375/295
(58) Field of Classification Search .................. 375/242, 375/254, 260, 261, 265, 267, 286, 295, 298, 375/299, 316; 370/204, 480, 498
See application file for complete search history.

(56) References Cited

U.S. PATENT DOCUMENTS

| | | | |
|---|---|---|---|
| 6,512,797 B1 * | 1/2003 | Tellado et al. | 375/261 |
| 7,154,957 B1 | 12/2006 | Monk et al. | |
| 2007/0160157 A1 * | 7/2007 | Miyoshi | 375/260 |
| 2007/0230613 A1 * | 10/2007 | Golitschek et al. | 375/295 |
| 2008/0137765 A1 * | 6/2008 | Dalla Torre et al. | 375/261 |
| 2009/0135926 A1 * | 5/2009 | Tsouri et al. | 375/260 |
| 2009/0135946 A1 * | 5/2009 | Dowling et al. | 375/286 |
| 2010/0195743 A1 * | 8/2010 | Barsoum et al. | 375/242 |

FOREIGN PATENT DOCUMENTS

| | | |
|---|---|---|
| EP | 1782554 B1 | 4/2008 |
| WO | 2005011219 A1 | 2/2005 |
| WO | 2006048037 A1 | 5/2006 |
| WO | 2007061416 A1 | 5/2007 |

OTHER PUBLICATIONS

Choi, et al., "A Transmit Preprocessing Technique for Multiuser MIMO Systems Using a Decomposition Approach," IEEE Transactions on Wireless Communications, vol. 3, Issue 1, Jan. 2004, pp. 20-24.

Harashima, et al., "Matched-Transmission Technique for Channels With Intersymbol Interference," IEEE Transactions on Communications, vol. 20, Issue 4, Aug. 1972, pp. 774-780.

Peel, et al., "A Vector-Perturbation Technique for Near-Capacity Multiantenna Multiuser Communication—Part I: Channel Inversion and Regularization," IEEE Transactions on Communications, vol. 53, Issue 1, Jan. 2005, pp. 195-202.

(Continued)

*Primary Examiner* — David C. Payne
*Assistant Examiner* — Syed Haider

(57) ABSTRACT

A transmitter generates a constellation pattern comprising replications of a first constellation. Each replication has a replication offset relative to a neighbouring replication and alternates between corresponding to the first constellation and an axis mirrored constellation (mirrored around the real and/or imaginary axis). The transmitter selects from the pattern such that a symbol for a data value corresponding to a first constellation point of the first constellation is selected from all replications of this constellation point. The constellation point resulting in the lowest transmit power for a combination of a plurality of antennas may be selected. A receiver receives the selected symbol and provides a folding operation to compensate for replications and mirroring. The replication offset may be lower than the minimum distance between symbols in the first constellation thereby resulting in an improved trade off between transmit power and error probability, e.g. in a Multiple Input Multiple Output system.

17 Claims, 13 Drawing Sheets

OTHER PUBLICATIONS

Hochwald, et al., "A Vector-Perturbation Technique for Near-Capacity Multiantenna Multiuser Communication—Part II: Perturbati," IEEE Transactions on Communications, vol. 53, Issue 3, Mar. 2005, pp. 537-544.

Jindal, et al., "Sum Power Iterative Water-Filing for Multi-Antenna Gaussian Broadcast Channels," IEEE Transactions on Information Theory, vol. 51, Issue 4, Apr. 2005, pp. 1570-1580.

Sharif, et al., "On the Capacity of MIMO Broadcast with Partial Side Information," IEEE Transactions on Information Theory, vol. 51, Issue 2, Feb. 2005, pp. 506-522.

Tomlinson, M., "New Automatic Equaliser Employing Modulo Arithmetic," Electronic Letters, vol. 7, Issue 5, Mar. 25, 1971, pp. 138-139.

* cited by examiner

WIRELESS COMMUNICATION OF DATA SYMBOLS

FIELD OF THE INVENTION

The invention relates to wireless communication of data symbols and in particular, but not exclusively, to transmission of data symbols in a Multiple Input Multiple Output (MIMO) communication system.

BACKGROUND OF THE INVENTION

In recent years, the popularity of systems using wireless radio communication has increased substantially. For example, cellular communication systems and wireless networks have now become commonplace. The increased requirement for frequency spectrum resource has led to an increased desire for efficient communication and especially at higher frequencies and for higher data rates.

For example, Broadband Wireless Access (BWA) systems are becoming common not only in fixed deployments but also in mobile deployments. In order to increase the capacity of such BWA systems, it is desirable to increase the data rate of the wireless communication. As a specific example, the Institute of Electrical and Electronic Engineers (IEEE) have formed a committee for standardizing an advanced air interface for operation in licensed bands known as IEEE 802.16m (Trademark). The 802.16m™ standard comprises BWA Medium Access Control (MAC) and Physical Layer (PHY) specifications aimed at enhancing BWA systems to meet the cellular layer requirements of International Telecommunications Union Radiocommunications Sector (IMT-Advanced) next generation mobile networks. Similarly, Wireless Local Area Networks (WLANs) are becoming common not only in business environments but also in domestic environments. The IEEE has formed a committee for standardizing a very high-speed WLAN standard known as IEEE 802.11vht. It is intended that the 802.11vht™ standard will help WLANs meet the expanding bandwidth needs of enterprise and home networks, as well as those of WLAN hot spots. Other popular examples of wireless networks include the more popular names of WiFi™ and WiMAX™ (corresponding to IEEE 802.11n and IEEE 802.16e).

In order to achieve high data rates over the air interface, a number of advanced radio techniques are employed. It has been found that significant improvement can be achieved by using multiple antennas at the transmitter and the receiver. In particular, many radio communication systems, such as WLANs, provide for a plurality of transmit and receive antennas to be used. Specifically, some transmission techniques involve transmitting a data stream by simultaneously transmitting different signals derived from the data stream from different antennas over the same communication channel. The receiver(s) of these techniques typically also comprise a plurality of antennas each of which receive a combined signal corresponding to the transmitted signals modified by the individual propagation characteristics of the radio link between the individual antennas. The receiver may then retrieve the transmitted data stream by evaluating the received combined signal.

Such techniques may be used in closed loop configurations wherein the receiver communicates information back to the transmitter allowing this to weight the signals to the individual antennas. Specifically, data may be fed back to the transmitter to allow this to implement suitable beamforming or pre-equalization. Such open and closed loop techniques are known as Multiple Transmit Multiple Receive (MTMR) or Multiple Input Multiple Output (MIMO) schemes and can be designed to derive benefit from spatial diversity between the antennas in order to improve detection. Indeed, both the equivalent Signal to Noise Ratio (SNR) of the combined signal and the available degrees of freedom are typically increased compared to the single antenna case thereby allowing higher channel symbol rates or higher order constellations. This may increase the data rate for the communication link and thus the capacity of the communication system.

In MIMO, the transmitted signals from each transmit antenna are typically weighted to provide improved performance. One technique is to apply a weight to each antenna in order to compensate for the experienced channel conditions. This approach is known as pre-equalization and utilizes linear precoding at the transmitter for interference suppression and to allow an increased number of users. However, it tends to suffer from the limitation that it in principle requires unconstrained transmitted energy from the multiple antennas and thus in practice results in high peak transmit powers.

In order to address this limitation, a vector perturbation technique has been introduced. This non-linear technique combines the conventional linear precoding with an extended symbol set. The transmitted energy from the multiple antennas is constrained by selecting the transmitted symbols from an extended symbol set which comprises not only the constellation points of the original constellation but also a large number of replicated constellations of this fundamental constellation. Thus, with vector perturbation, a constellation pattern is generated with translated/offset copies of the constellation points of the basic constellation. A data symbol corresponding to a specific constellation point of the basic constellation may be selected to be represented by a channel symbol corresponds to any replications of the specific constellation point. Thus, the transmitted channel symbols may be selected as the constellation points for which the transmit processing (the weighting and summation for each transmit antenna) results in the smallest overall transmit power.

The receiver may then decode the received symbols by applying a modulo function that results in all replicated constellation points being transformed to the same constellation point. One specific way of selecting the channel symbols from the replicated constellations is known as sphere encoding and is based on a closest lattice point search algorithm that minimizes the Euclidean norm (energy) of the transmitted vector.

Hence, an improved system would be advantageous and in particular a system allowing increased flexibility, reduced error rate, simplified receiver operation, reduced complexity, improved trade-off between transmit power and error performance and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a method of transmitting data symbols, the method comprising: providing a constellation pattern comprising replications of a combined constellation with different translations such that each replication has a combination replication offset relative to a neighboring replication, the combined constellation comprising at least a first constellation and a second constellation with a first translation offset between the first constellation and the second constellation and the second constellation corresponding to an axis mirroring of the first constellation around at least one of a real axis and an imaginary axis; selecting symbols for transmission from the constellation pattern, the selection including for a data value corresponding to a first constellation point of the first constellation selecting a symbol from replications of the first constellation point in the constellation pattern to meet a criterion; and transmitting the selected symbols.

According to another aspect of the invention there is provided a method of method of receiving data symbols comprising: receiving a received symbol corresponding to a constellation point selected from corresponding constellation points of a constellation pattern comprising replications of a first constellation, each replication having a replication offset relative to a neighbouring replication and each replication alternating between corresponding to the first constellation and a constellation of a set of at least one axis mirrored constellation of the first constellation around at least one of the real axis and an imaginary axis; folding the received symbol into a region corresponding to the first constellation to generate a decoding symbol; and determining a received data symbol value from the decoding symbol.

The invention may allow improved performance for a communication system wherein data symbols are communicated from a transmitter to a receiver. The invention may in particular provide improved MIMO performance with pre-equalization and reduced transmit powers. Furthermore, this may be achieved with a reduced error rate. A low complexity of both the transmitter and receiver operation can be achieved.

In accordance with an optional feature of the invention, the translation offset may be such that a first distance between at least one corresponding constellation point of the first constellation and the second constellation is less than a second distance between a pair of constellation points of the first constellation having a minimum distance of the first constellation. Also, the distance between at least two corresponding constellation points of neighbouring replications may be less than a second distance between a pair of constellation points of the first constellation having a minimum distance of the first constellation.

This may allow an improved trade-off between the transmit power and the error rate. In particular, corresponding constellation points may be moved closer together thereby providing a tighter replication pattern allowing a more accurate selection of constellation points that combine to result in a reduced transmit power. Furthermore, as this closer replication pattern reduces the distance between corresponding constellation points the minimum distance between non-corresponding constellation points still corresponds to the minimum distance within the first constellation thereby resulting in the error rate still being dominated by this minimum distance. Thus, the approach may allow a significant reduction in the transmit power while only introducing a negligent or acceptable error rate degradation.

According to another aspect of the invention there is provided a transmitter for transmitting data symbols, the method comprising: a unit for providing a constellation pattern comprising replications of a combined constellation with different translations such that each replication has a combination replication offset relative to a neighbouring replication, the combined constellation comprising at least a first constellation and a second constellation with a first translation offset between the first constellation and the second constellation and the second constellation corresponding to an axis mirroring of the first constellation around at least one of a real axis and an imaginary axis; a channel symbol selector for selecting symbols for transmission from the constellation pattern, the selection including for a data value corresponding to a first constellation point of the first constellation selecting a symbol from replications of the first constellation point in the constellation pattern to meet a criterion; and a transmitter unit for transmitting the selected symbols.

According to another aspect of the invention there is provided a receiver for receiving data symbols comprising: a receiving unit for receiving a received symbol corresponding to a constellation point selected from corresponding constellation points of a constellation pattern comprising replications of a first constellation, each replication having a replication offset relative to a neighbouring replication and each replication alternating between corresponding to the first constellation and a constellation of a set of at least one axis mirrored constellation of the first constellation around at least one of the real axis and an imaginary axis; a processor for folding the received symbol into a region corresponding to the first constellation to generate a decoding symbol; and a decision unit for determining a received data symbol value from the decoding symbol.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

Figure 1:
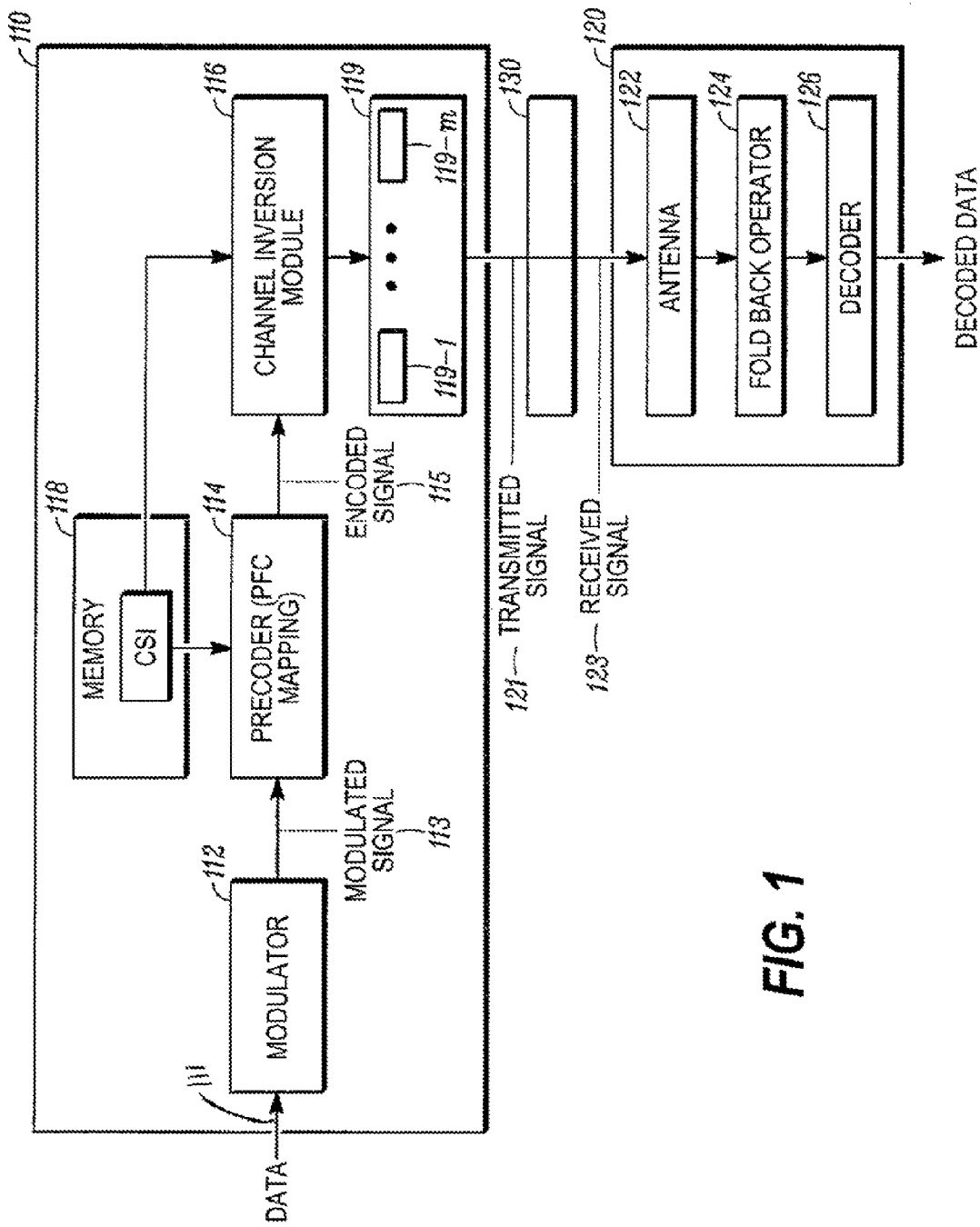
FIG. 1 illustrates an example of a block diagram of a multi-user MIMO communication system in accordance with some embodiments of the invention.

FIG. 1 illustrates an example of a block diagram of a multi-user MIMO communication system 100 in accordance with some embodiments of the present invention. The multi-user MIMO communication system 100 comprises a base station 110 (referred to herein as a transmitter 110) and a mobile station 120 (referred to herein as receiver 120) communicating via a communication link 130, e.g. an over an air interface. Even though only one receiver 120 is shown, any number of receivers may interface with the transmitter 110. Thus, the depiction of one receiver 120 is not meant to be a limitation. In any case, the multi-user MIMO communication system 100 enables the transmitter 110 to communicate with a receiver 120 or a number of receivers simultaneously.

The transmitter 110 of the multi-user MIMO communication system 100 comprises a modulator 112, a precoder 114, a channel inversion module 116, a memory 118, and multiple antennas 119-1 through 119-$m$. The modulator 112 modulates data 111 to be transmitted to produce a modulated signal 113. Specifically, for the stream of incoming data, the modulator 112 generates Quadrature Amplitude Modulation (QAM) symbols in accordance with a suitable first constellation. In the specific example, pairs of incoming data bits are combined into Quarternary Phase Shift Keying (QPSK) symbols represented by complex symbols (corresponding to an In-phase and Quadrature component).

The modulated signal 113 (i.e. the QPSK symbols) is fed into the precoder 114. The precoder 114 computes channel inversion information and perturbation information for the modulated signal 113. The precoder 114 further perturbs the modulated signal 113 based on the channel inversion information, perturbation information, and information received from the memory 118 to obtain an encoded signal 115. In one example, the memory 118 stores channel state information and the channel state information is used to perturb the modulated signal 113. In any case, the precoder 114 perturbs the modulated signal 113 by encoding the modulated signal 113 to obtain the encoded signal 115. In the example, the process of perturbing the modulated signal 113 to obtain the encoded signal 115 is referred to as periodically flipped constellation mapping. The encoded signal 115 is fed into the channel inversion module 116 so that the channel inversion information and the channel state information is applied to the encoded signal 115 to allow signals to be directed into one of the multiple antennas 119-1 through 119-*m* which then radiates a transmitted signal 121 via the communication link 130 to the receiver 120. Specifically, the channel inversion module weights the precoded channel symbols for each of the multiple antennas 119-1 through 119-*m* before feeding them in parallel to the multiple antennas 119-1 through 119-*m*. Thus, in accordance with MIMO operation, the precoded symbols are (following the weighting by the channel inversion module 116) simultaneously transmitted from the plurality of antennas 119-1 through 119-*m*.

The receiver 120 of the multi-user MIMO communication system 100 comprises at least one antenna 122, a fold back operator 124 and a decoder 126. The antenna(s) 122 of the receiver 120 receives the transmitted signal 121 from the transmitter 110 and feeds the received signal 123 to the fold back operator 124. Due to the pre-equalisation of the channel inversion module 116 the received symbol ideally (i.e. in the absence of noise and distortion) corresponds to the precoded symbol generated by the precoder 114. The fold back operator 124 performs fold back operation on the received signal 123 to eliminate perturbation (i.e. it reverses the operation of the precoder 114), and sends the resulting signal to the decoder 126. The decoder 126 then performs a symbol decision to detect the original data (referred to as "decoded data").

Figure 2:
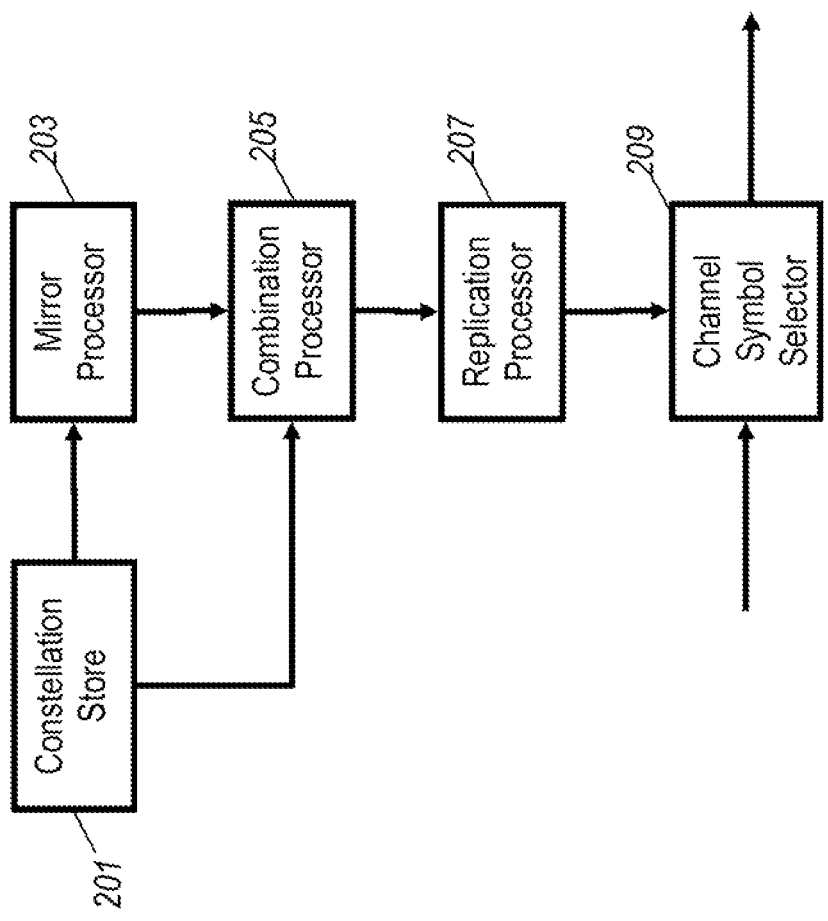
FIG. 2 illustrates an example of elements of a precoder for a transmitter in accordance with some embodiments of the invention.

FIG. 2 illustrates elements of the precoder 114 in more detail. The precoder 114 comprises a constellation store 201 coupled to a mirror processor 203 and a combination processor 205 which is also coupled to the mirror processor 203. The combination processor 205 is coupled to a replication processor 207 which is further coupled to a channel symbol selector 209 that receives the data symbols from the modulator 112 and the channel state information from the memory 118 and which in return generates the channel symbols/precoded symbols fed to the channel inversion module 116.

Figure 3:
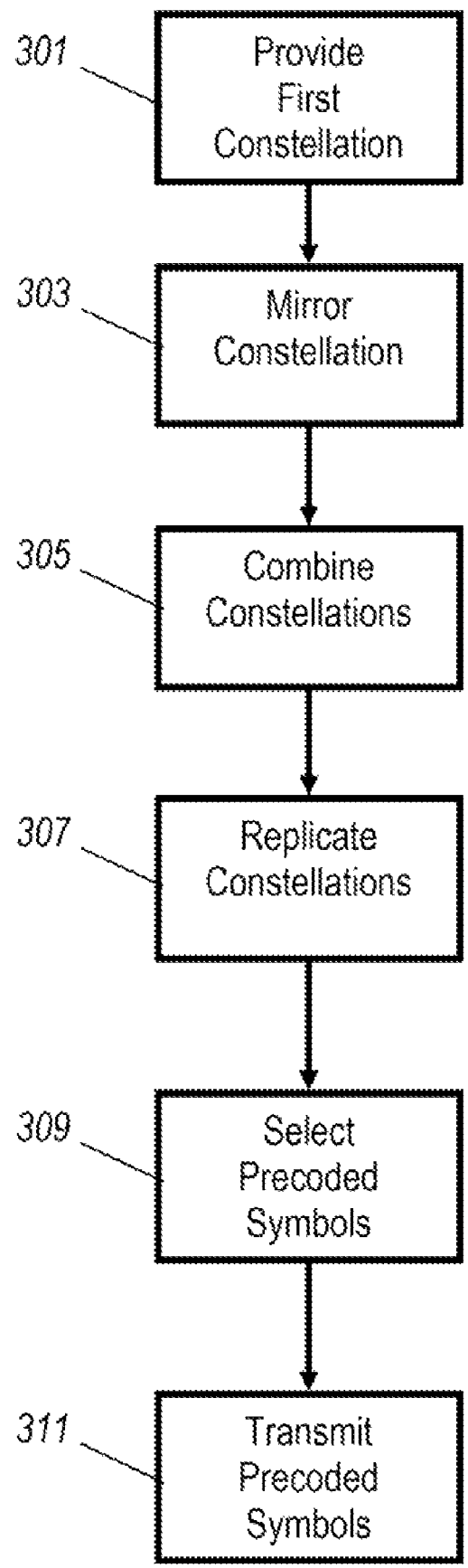
FIG. 3 illustrates an example of a method of transmitting in accordance with some embodiments of the invention.
Figure 4:
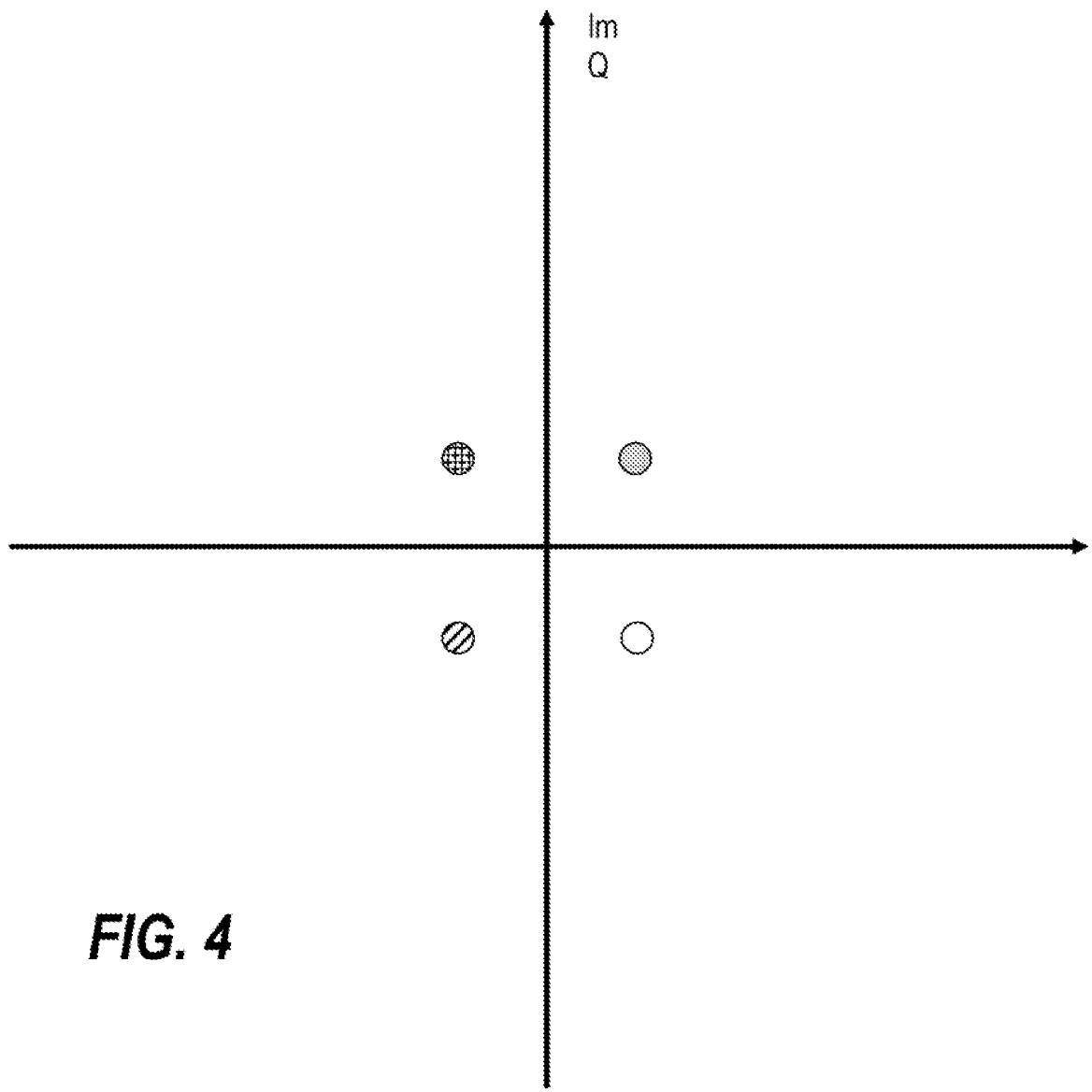
FIGS. 4-8 illustrate examples of constellations used by a transmitter in accordance with some embodiments of the invention.

The operation of the exemplary precoder 114 of FIG. 2 will be described with reference to the method illustrated in FIG. 3. The method initiates in step 301 wherein a first constellation for complex symbols is provided. The constellation is, in the example, a QPSK constellation but it will be appreciated that in other embodiments other symbol constellations may be used including other QAM constellations such as BPSK symbols. In the example, the constellation is provided from the constellation store 201 and fed to the mirror processor 203 and the combination processor 205. FIG. 4 illustrates a specific example of the QPSK constellation.

The method continues in step 303 wherein the mirror processor 203 generates mirrored copies of the constellation by mirroring the first constellation around at least one of a real axis and an imaginary axis, i.e., around one or both of the In-phase (I) axis and the Quadrature (Q) axis. In the specific example, the mirror processor 203 generates three mirrored constellations, namely one corresponding to a mirroring around the real axis, one corresponding to a mirroring around the imaginary axis and one corresponding to a mirroring around both the real and the imaginary axis. However, it will be appreciated that in other embodiments other numbers of mirroring may be used.

Figure 5:
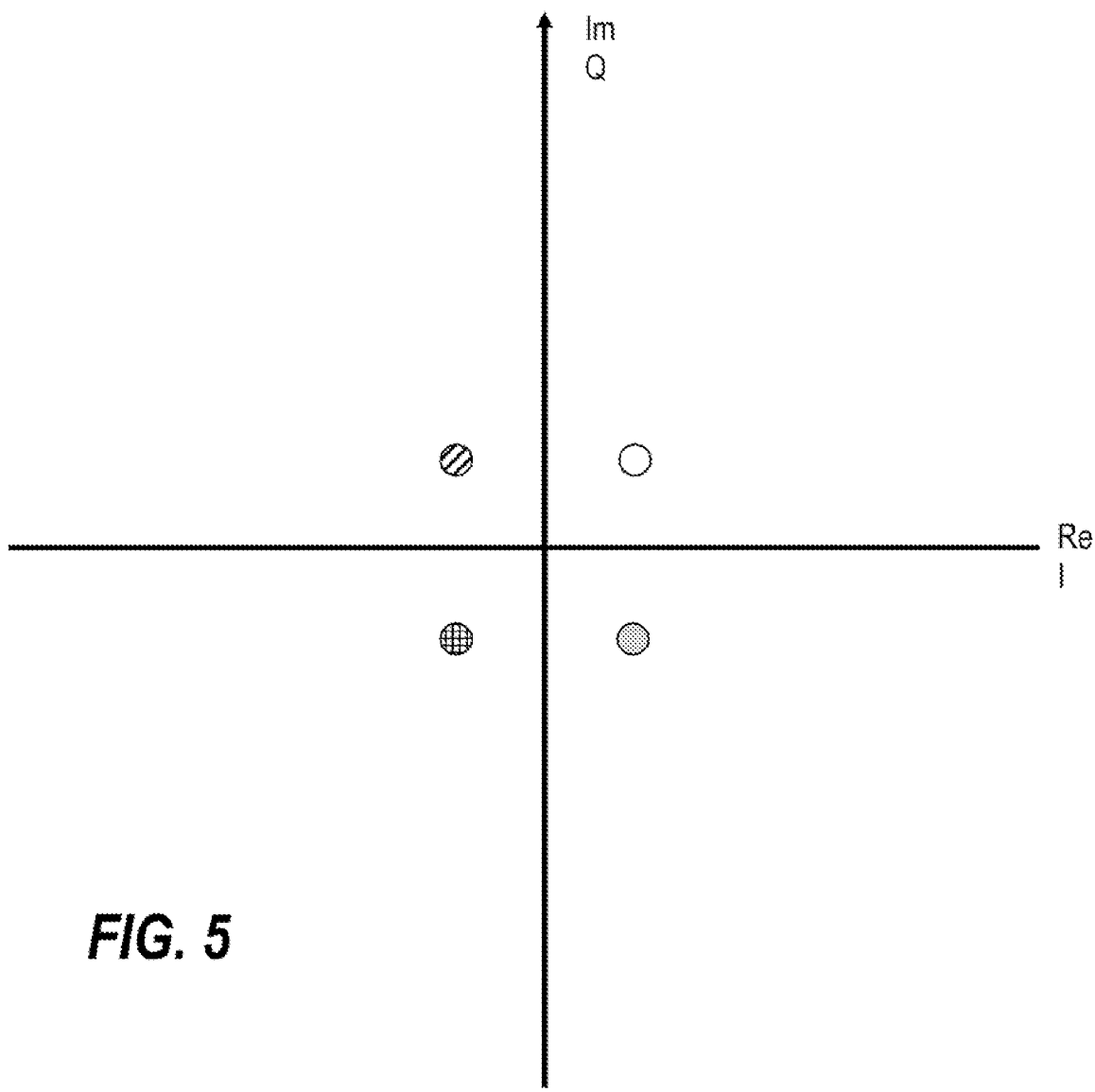
Figure 6:
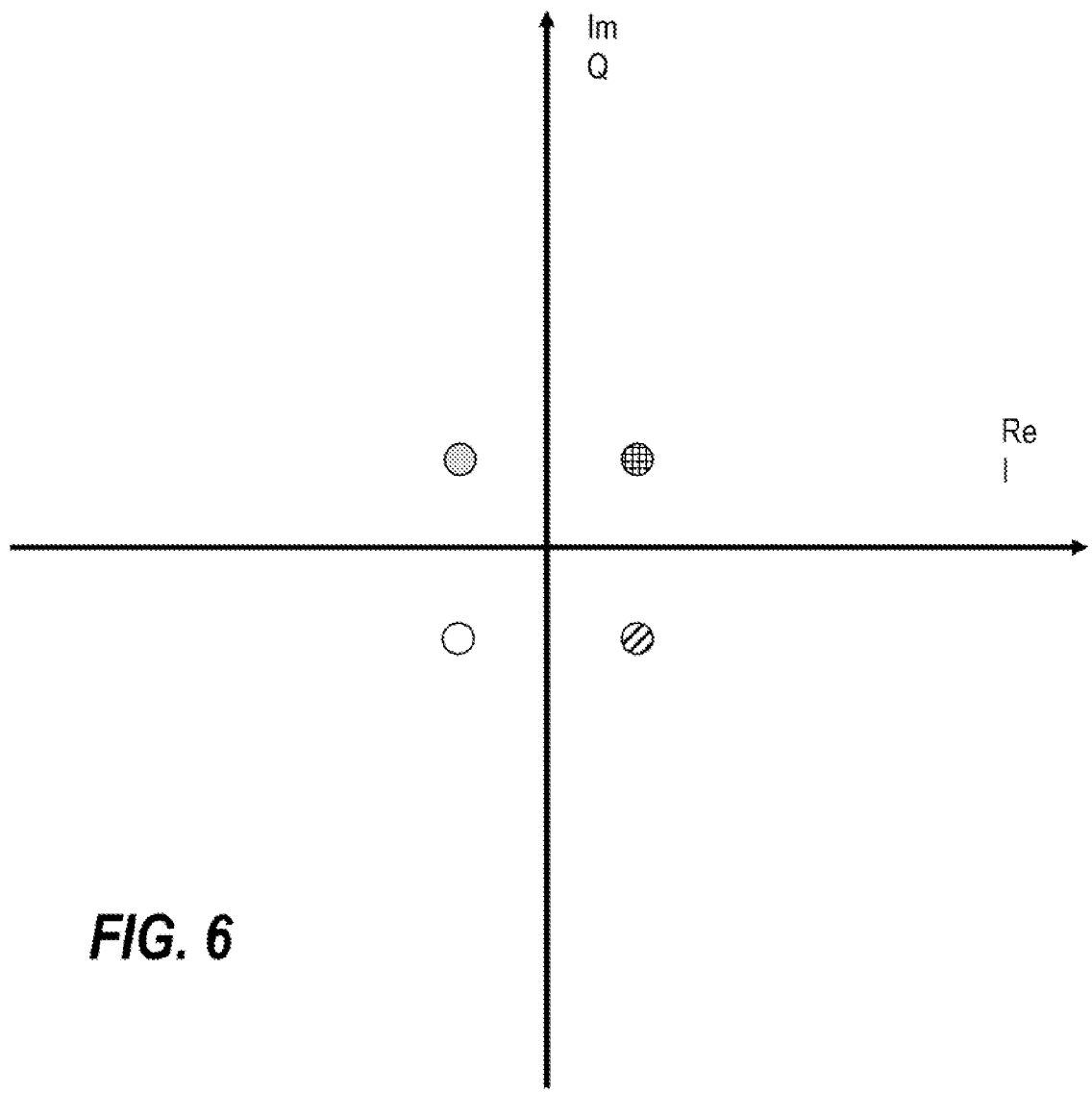
Figure 7:
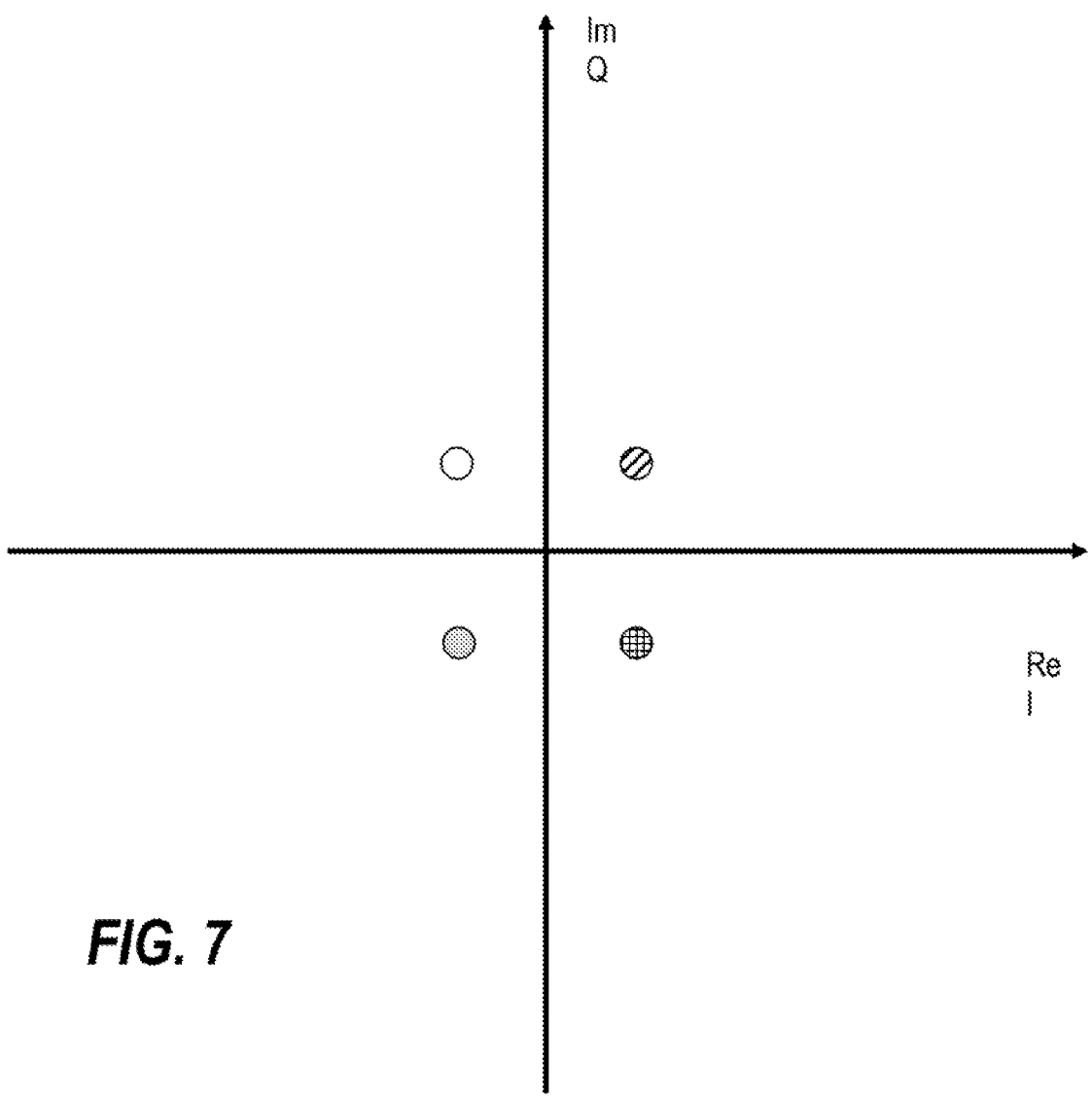

Thus, the mirror processor 203 mirrors the first constellation around the real axis to generate a second constellation as shown in FIG. 5, around the imaginary axis to generate a third constellation as shown in FIG. 6, and around both the real and the imaginary axis to generate a fourth constellation as shown in FIG. 7.

The method then continues in step 305 wherein the combination processor generates a combined constellation from the original first constellation and one or more of the mirrored constellations. The combined constellation is generated by translating one or more of the constellations being combined such that a new constellation results. Thus, each mirrored constellation included in the combination will be translationally offset relative to the first constellation (and to each other).

Figure 8:
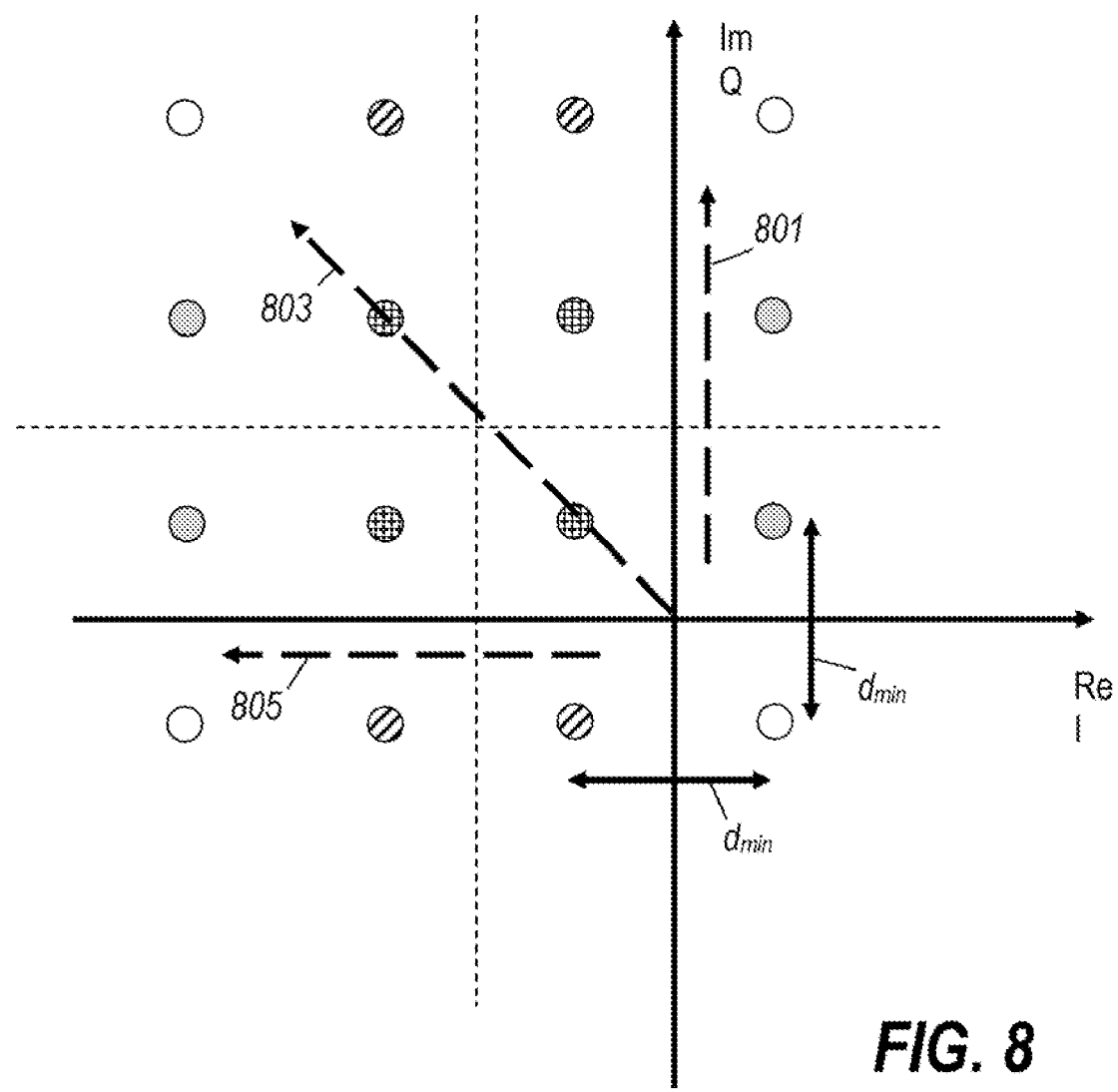

FIG. 8 illustrates an example of a combined constellation for the specific example where both the original constellation of FIG. 4 as well as all the mirrored constellations of FIGS. 5-7 are combined with each mirrored constellation having a translation offset relative to the first constellation. In particular, the translation offset for each of the mirrored constellations is such that the distance between neighbouring constellation points are the same as the distance between neighbouring constellation points in the original first constellation. For the specific example, this corresponds to the second constellation having a translation offset 801 of two times the minimum distance, $d_{min}$, between symbols of the first constellation along the imaginary axis, the third constellation having a translation offset 803 of two times the minimum distance along the real axis, and the fourth constellation having a translation offset 805 of two times the minimum distance along both the real and the imaginary axis.

Thus, a combined constellation offset is generated by translating the different constellations using different translation offsets. The translation offsets are specifically selected such that a regular pattern is generated. In the example the translation offset 803 of the fourth constellation is equal to the (vector) sum of the translation offsets 801, 805 for the second and third constellation. The resulting combined constellation has a number of constellation points that corresponds to the sum of the constellation points in the constellations being combined. However, for each constellation of the first constellation, the combined constellation has a set of corresponding constellation points corresponding to the number of individual constellations that have been combined.

Figure 9:
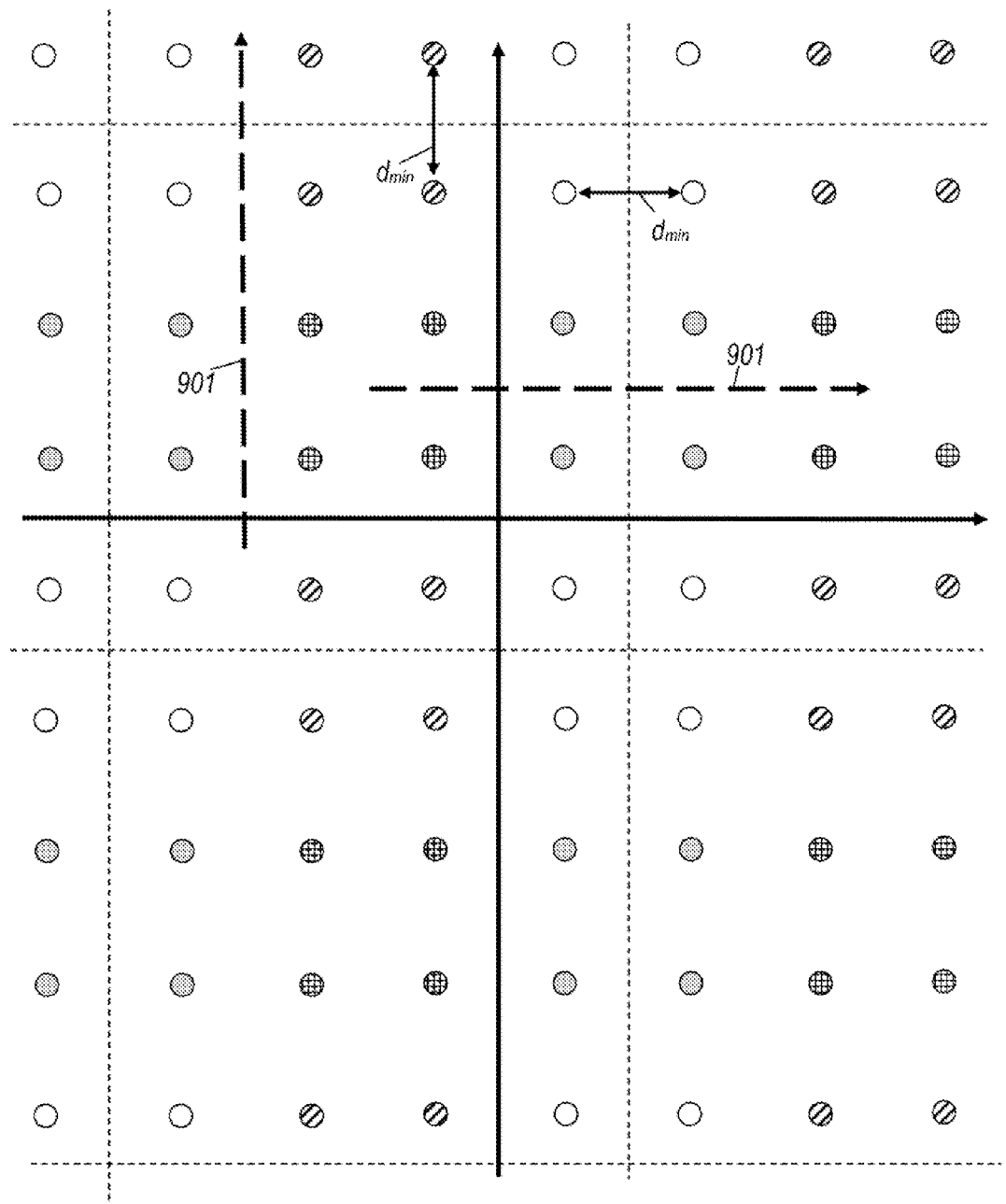
FIG. 9 illustrates an example of a constellation pattern used by a transmitter in accordance with some embodiments of the invention.

Step 305 is followed by step 307 wherein the replication processor 207 generates a constellation pattern by replicating the combined constellation. The replications are offset with different translation offsets such that each replication has a replication offset relative to a neighbouring replication. FIG. 9 illustrates an example of such a replication. It will be appreciated that the replication may in principle be infinite i.e. the pattern may in principle extend over the entire constellation plane although in practice only a finite area of the constellation plane will typically be used to select symbol values.

In the example of FIG. 9, the combination replication offsets (e.g. illustrated by arrows 901) for each of the replications is such that the distance between (corresponding) neighbouring constellation points are the same as the minimum distance $d_{min}$ between neighbouring constellation points in the original first constellation. For the specific example, this corresponds to a translation offset between two neighbouring constellations being four times the minimum distance between symbols of the first constellation.

Thus, the replication processor 207 provides a constellation pattern which comprises replications of the combined constellation with different translations such that each replication has a combination replication offset relative to a neighbouring replication. The combined constellation comprises the first constellation and the second constellation with a first translation offset between them, as well as in the example the third and fourth constellation with different translation offsets. Also, the second, third and forth constellations correspond to axis mirrored versions of the first constellation wherein the axis mirroring is around the real axis, the imaginary axis and both the real and the imaginary axis respectively.

It will be appreciated that the constellation pattern need not be derived by the transmitter as described with reference to FIGS. 2 and 3. For example, the replication pattern may simply be provided by precoder 114 as a predetermined equation defining the replicated constellation points corresponding to the different constellation points of the first constellation.

The method continues in step 309 wherein the channel symbol selector 209 selects precoded symbols from the constellation pattern generated in step 307. The selection is performed such that when selecting a precoded symbol for a data value corresponding to a first constellation point of the first constellation, the precoded symbol is selected as a constellation point from the group of constellation points of the constellation pattern that originated from the first constellation point. Thus, although the constellation pattern of FIG. 9 in principle contains an infinite number of constellation points it is only used to represent the same four data symbols as the original first constellation of FIG. 4.

The selection of which of the infinite number of corresponding constellation points is used to represent a specific data value is based on a suitable criterion. Specifically, the constellation point may be selected in response to the channel state information from the memory 118. The channel symbol selector may specifically be arranged to select constellation points such that the combined transmit power for the multiple antennas 119-1 to 119-$m$ is minimised following the pre-equalisation performed by the channel inversion module 116. In the specific example, Sphere encoding may be used to select the precoded symbols from the corresponding constellation points.

Step 309 is followed by step 311 wherein the precoded symbols are transmitted. Specifically, the precoded symbols are fed to the channel inversion module 116 wherein they are pre-equalised. The resulting pre-equalised symbols are then transmitted from the multiple antennas 119-1 to 119-$m$ using MIMO transmission.

Thus, the transmitter 110 transmits precoded symbols which correspond to a constellation point that is selected from corresponding constellation points of a constellation pattern comprising replications of a first constellation. Each replication has a replication offset relative to a neighbouring replication and each replication alternates between corresponding to the first constellation and corresponding to an axis mirrored constellation of the first constellation around at least one of the real axis and an imaginary axis. The precoded symbols are pre-equalised by the channel inversion module 116 and are accordingly received at the receiver 120 following the modification by the channel 130. In an ideal scenario, the received symbols correspond directly to the precoded symbols as the pre-equalisation exactly negates the impact of the channel 130. However, in practical scenarios, the pre-equalisation is only approximate and noise and distortion will be introduced to the received symbols.

Figure 10:
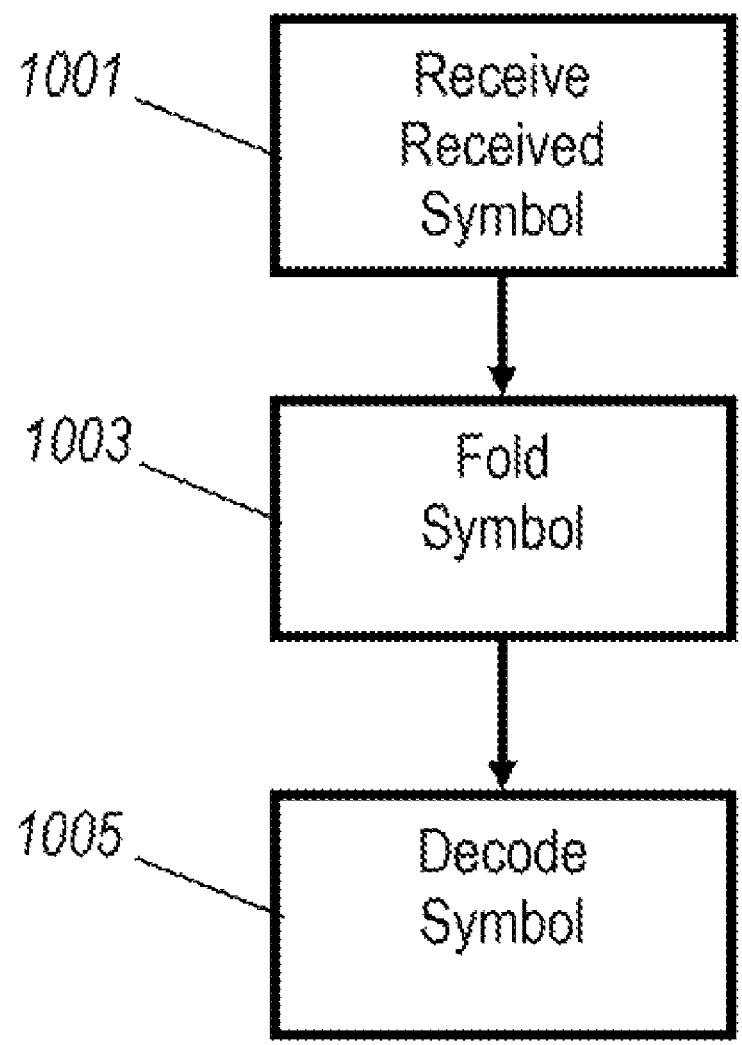
FIG. 10 illustrates an example of a method of receiving in accordance with some embodiments of the invention.

FIG. 10 illustrates a method of receiving the data symbols transmitted from the transmitter 110. The method initiates in step 1001 wherein the antenna 122 and associated receive circuitry receives the received symbols. It will be appreciated that any suitable MIMO reception may be used such as Successive Interference Cancellation as will be known to the skilled person and which for brevity will not be further described herein. The resulting received symbols thus correspond to the precoded symbols with the addition of a noise component which represents the contribution from noise, interference, imperfect pre-equalisation, distortion, imperfect reception etc.

Step 1001 is followed by step 1003 wherein a decoding symbol is generated by the received symbol being folded into a region corresponding to the first constellation. Step 1003 is followed by step 1005 wherein the decoder 126 determines a received data symbol value from the decoding symbol. Specifically, a simple QPSK decision approach may be used. The folding performed by the fold back operator 124 (step 1003) basically corresponds to translating/moving the constellation point by a value corresponding to the difference between the original first constellation and the replicated constellation to which the pre-coded symbol belongs followed by axis mirroring corresponding to that which has been applied to the replicated constellation. This may specifically be achieved by first determining an integer replication offset between the received symbol and the region corresponding to the first constellation for the first axis. The integer replication offset is indicative of a whole number of replication offsets that are between the received symbol and the region of the first constellation diagram.

Figure 11:
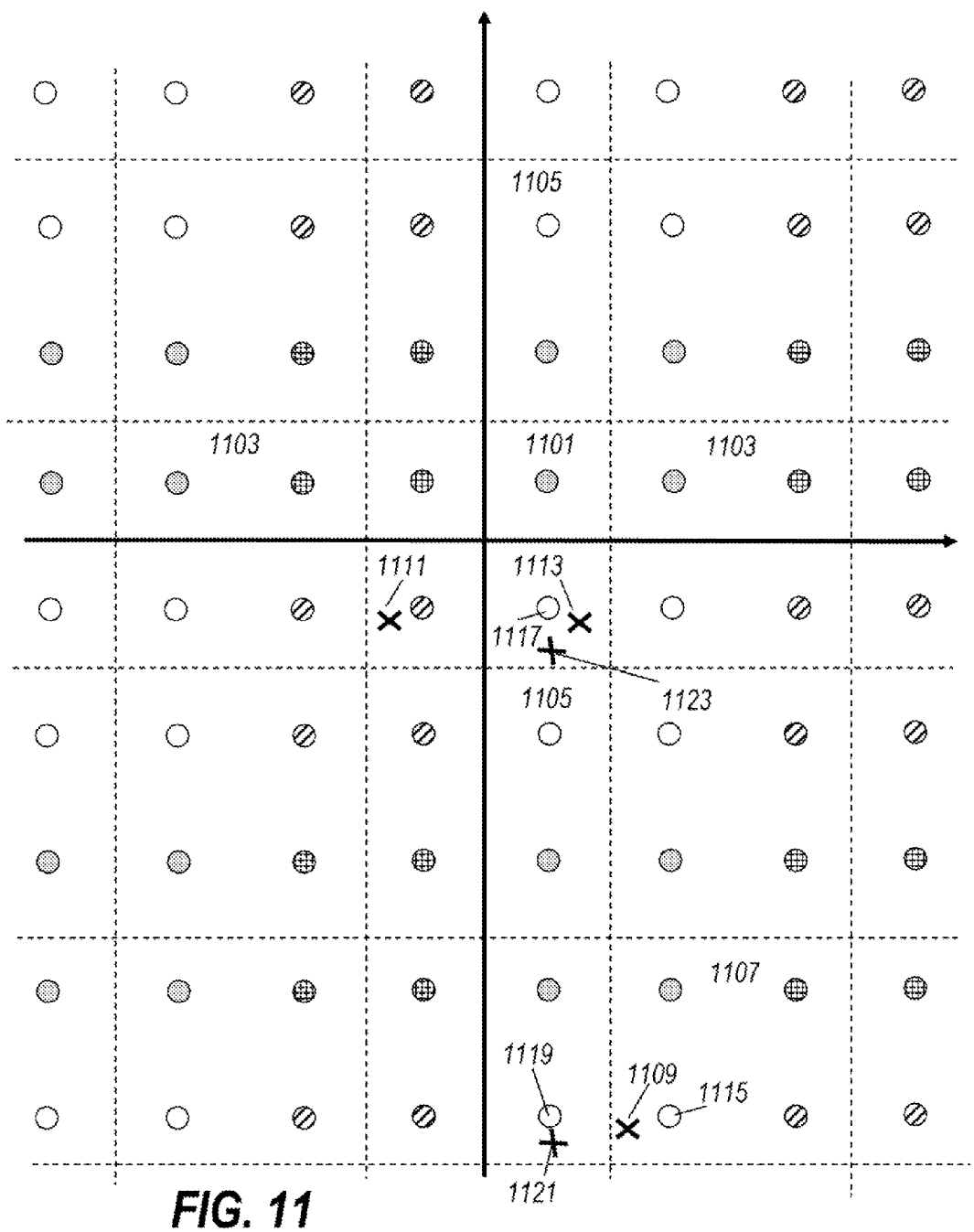
FIGS. 11-13 illustrate some examples of constellation patterns used by a transmitter in accordance with some embodiments of the invention.

For example, FIG. 11 illustrates the constellation replications corresponding to the constellation pattern of FIG. 9. In the example, the first constellation region 1101 has a size of $2 \cdot d_{min}$ along both the real and imaginary axis. Thus, the replication offset between each neighbour replication has a value of $2 \cdot d_{min}$. Thus, in the example, any received symbol falling in any of the neighbouring replicated constellations 1103 has an integer replication offset of 1 along the real axis and 0 along the imaginary axis. Similarly, any received symbol falling in any of the neighbouring replicated constellations 1105 has an integer replication offset of 1 along the imaginary axis and 0 along the real axis. As another example, any received symbol falling in the region of the replicated constellation 1107 will have an integer replication offset of 1 along the real axis and 2 along the imaginary axis.

The integer replication offsets, p, may specifically be determined by:

$$p_r = \left[\frac{\mathcal{R}(x)}{\tau} + \frac{1}{2}\right], p_i = \left[\frac{\mathcal{I}(x)}{\tau} + \frac{1}{2}\right]$$

where $p_r$ and $p_i$ represent respectively the number of folds (the integer replication offsets) for the real axis and for the imaginary axis, τ represents the replication offset between neighboring replications which in this example is 2·$d_{min}$, [.] denotes the flooring operator, and x is the received symbol (complex value).

It will be appreciated that in some embodiments, the first constellation may not necessarily be centered on the intersection of the real and imaginary axis but may be offset by a given vector. In such a case, the received symbol may first be offset by a corresponding value prior to determining the integer replication offset (effectively corresponding to moving the first constellation to be centred on the intersection of the axes). The received symbol is subsequently offset along the real and imaginary axes to move the received symbol into the region 1101 of the first constellation. However, the relative position of the received symbol in the constellation is maintained. Specifically, this is achieved by offsetting the received symbol by a value corresponding to the integer replication offset multiplied by the replication offset.

Thus, an offset symbol, y, is generated as:

$$\Re(y) = (\Re(x) - p_r \cdot \tau), \; \Im(y) = (\Im(x) - p_i \cdot \tau)$$

As an example, the received symbol 1109 will be moved to the location corresponding to offset symbol 1111.

Following the translational movement, axis mirroring is then applied to reflect the axis mirroring of the replicated constellation of the region in which the received symbol is located. As the neighbouring replicated constellations are mirrored with respect to each other along the real and the imaginary axis this corresponds to applying a mirroring around the imaginary axis (only) if the integer replication offset along the real axis is odd and around a mirroring around the real axis (only) if the integer replication offset along the imaginary axis is odd.

For example, for the received symbol 1109, the replicated constellation in which the received symbol was received has a integer replication offset of (1, 2) and accordingly the offset symbol 1111 is mirrored around the imaginary axis to generate decoding symbol 1113. This corresponds to the fact that the replicated constellation 1107 corresponds to the first constellation 1101 mirrored around the imaginary axis.

Thus, more specifically, the decoding symbol, z, may be found from the received symbol by applying the equation:

$$\Re(z) = (-1)^{p_r} \cdot (\Re(x) - p_r \cdot \tau), \; \Im(z) = (-1)^{p_i} \cdot (\Im(x) - p_i \cdot \tau)$$

The data symbol can then simply be decoded by determining the constellation point closest to the decoding symbol i.e. a standard QPSK symbol decision can be applied. Thus, it will be appreciated that the operation of the foldback operator 120 corresponds to a folding of the replicated constellations to the first constellation along the borderlines between the replicated constellations.

It will also be appreciated that the receive processing maintains the relative offset between the received symbol and the constellation points. E.g. for the specific example, the relative difference between the received symbol 1109 and the closest constellation point 1115 is the same as the relative distance between the decoding symbol 1113 and the closest constellation point 1117 of the first constellation 1101.

An advantage of applying the described periodical flipping or mirroring rather than merely copying the first constellation as e.g. used in traditional vector perturbation is that the error rate may be reduced. For example, a conventional copying or replication will result in a symmetric minimum distance to surrounding symbols of $d_{min}$. However, in the described system, the mirroring is introduced such that replications of the first constellation result in some neighbouring constellation points being identical. For example, one of the neighbouring constellation points 1119 of the constellation point 1115 corresponds to the same data value and will accordingly be decoded as the same value. Thus, some noise contributions resulting in a distance above $d_{min}$ will not result in a data error. For example, if constellation point 1115 was selected as the pre-coded symbol and noise resulted in the received symbol 1121 being received in a different constellation, this would be folded into decoding symbol 1123 resulting in the correct data value being decoded. In a conventional system, the neighbouring symbol 1119 would correspond to a different data value resulting in an error.

Thus, improved error performance can be achieved without adding (significant) complexity to the transmitter or receiver.

In some embodiments, an improved and more flexible trade-off between transmit power and error performance may be achieved. Specifically, this may be achieved by adjusting the replication offset between neighbouring replicated constellations. This may result in constellation points that are closer together thereby allowing a more accurate selection of precoded values resulting in a reduced transmit power. However, it may also result in an increased error rate. Thus, by carefully selecting a suitable offset, an improved trade-off may be achieved.

The following description (and indeed the description of FIGS. 9 and 11) are based on the translation offsets between neighbouring constellations in the combined constellation being the same as the translation offset between neighbouring constellations of different replications. This results in a regular pattern which may provide facilitated operation but it will be appreciated that in other embodiments these translation offsets may not necessarily be the same.

Thus, in some embodiments, the replication offset between neighbouring replication constellations is such that the distance between at least two corresponding constellation points of neighbouring replications is less than the distance between a pair of constellation points of the first constellation having a minimum distance. Thus, in the example, this corresponds to both the translation offset for constellations of the combined constellation and the combination replication offsets (i.e. between replications of the combined constellation being such that the distance between neighbouring corresponding constellation point of different constellations being less than the minimum distance, $d_{min}$, for the first constellation.

Thus, in this embodiment, the minimum distance between symbols that correspond to different data values is maintained as the minimum distance $d_{min}$ of the first constellation whereas the distance between neighbouring symbols (corresponding to different replications of the same constellation point) being less than $d_{min}$. In particular, the distance (henceforth referred to as the neighbour replication distance) between neighbouring symbols of different replications of the first constellation is set to $\alpha \cdot d_{min}$ wherein $0 \leq \alpha < 1$.

Figure 12:
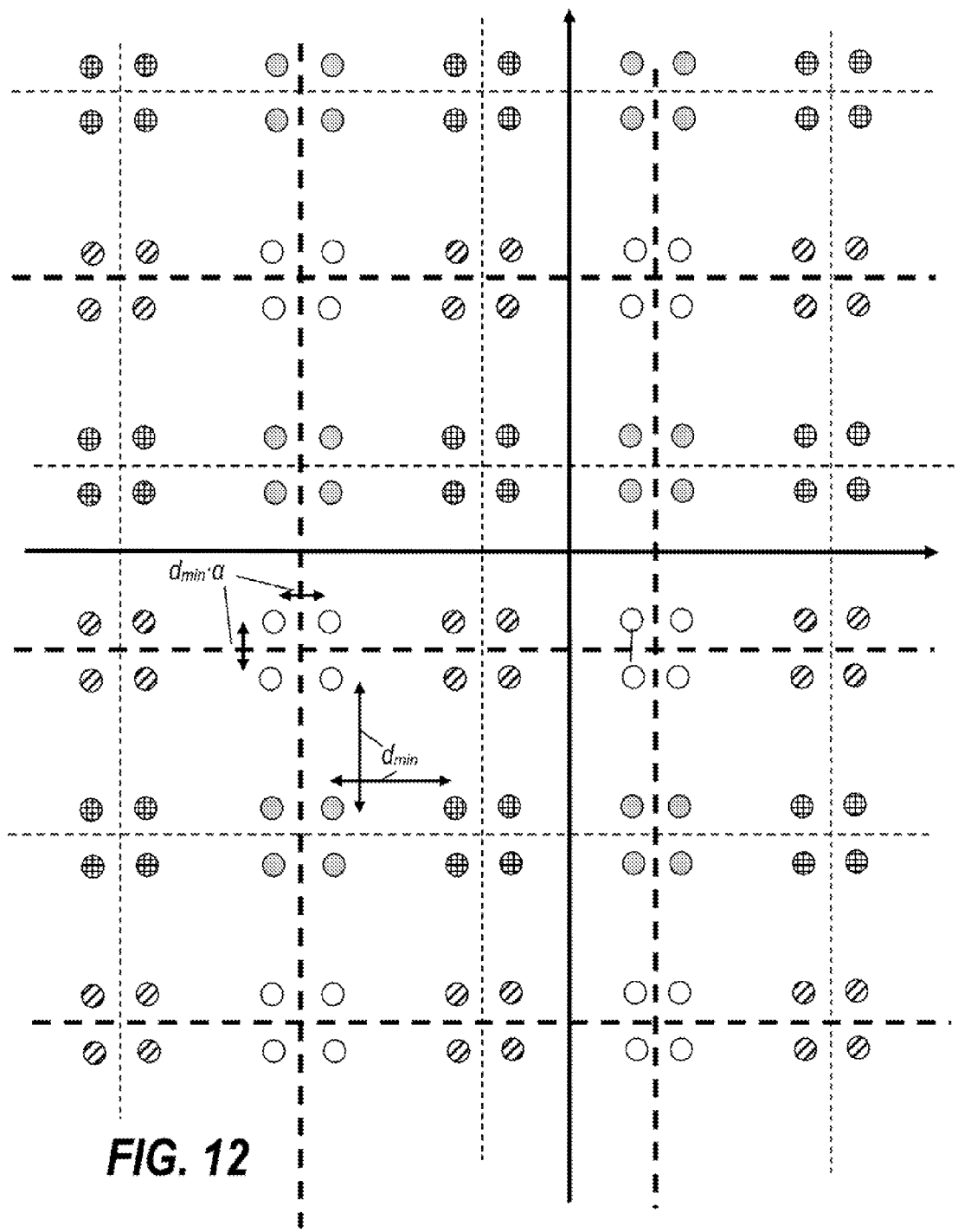

FIG. 12 illustrates such an example for α approximately equal to 0.5. As can be seen, the distance between neighbouring symbols within each constellation is maintained at $d_{min}$ whereas the distance across replication borders is reduced to approximately $0.5 \cdot d_{min}$. As a result, a more compact constellation pattern is achieved with more possible constellation points to choose from. Accordingly, the precoder 114 may select precoded symbols that are closer to the preferred value for reducing transmit power and accordingly a reduced transmit power can be achieved. However, the reduction in the distance may also increase the error rate as the distance to a wrong symbol decision will be reduced from $2 \cdot d_{min}$ to 1.5·$d_{min}$ in some directions. However, as the error rate has an exponential relationship to the distance, this reduction will be relatively insignificant except for very small values of $\alpha$. In other words, except for very small values of $\alpha$, the error performance will be dominated by the contribution from the neighbouring non-corresponding symbols with a minimum distance of $d_{min}$ relative to the contribution from the neighbouring non-corresponding symbols with a minimum distance of $(1+\alpha)·d_{min}$.

Figure 13:
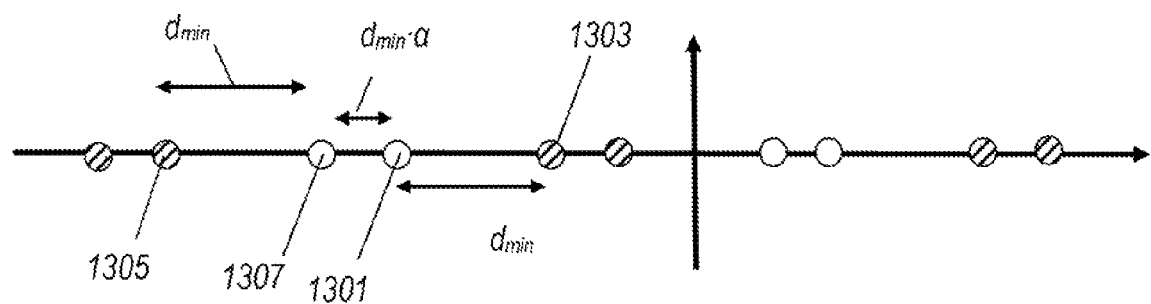

As a clarifying example, FIG. 13 illustrates a constellation pattern for a BPSK example. If a precoded symbol corresponding to the constellation point of 1301 is transmitted, an error will occur if noise causes this to be received closer to constellation point 1303 or 1305 (but not 1307). The first error probability is given by the distance of $d_{min}$ between the constellation points 1301 and 1303 whereas the second error probability is given by the distance of $\alpha·d_{min}$ between the constellation points 1301 and 1305. Thus, the total error probability is approximated by (assuming white additive Gaussian noise):

$$p_e = Q\left(\frac{d_{min}}{\sqrt{2\sigma^2}}\right) + Q\left(\frac{(1+\alpha)d_{min}}{\sqrt{2\sigma^2}}\right)$$

where $Q(x)$ is the Gaussian tail function and $\sigma^2$ is the variance of the noise. However, as $Q(x)$ is highly non-linear and indeed can be closely approximated by $\frac{1}{2}\exp(-x^2/2)$, the first term will tend to dominate, i.e.

$$Q\left(\frac{d_{min}}{\sqrt{2\sigma^2}}\right) \gg Q\left(\frac{(1+\alpha)d_{min}}{\sqrt{2\sigma^2}}\right),$$

except for $\alpha$ being very small. Accordingly, $\alpha$ can often be set relatively low with only negligible error performance degradation while allowing a significant reduction in the average transmit power.

Thus, the trade-off between error probability and the average transmit power may be effectively adjusted by a suitable selection of the value $\alpha$. Thus, whereas a choice of $\alpha=1$ may be used, this is a relatively large value for which the error probability is not very sensitive to variations in $\alpha$ (as this probability is dominated by the closer symbol) However, for $\alpha$ close to 1 the transmit power is sensitive to the specific value of $\alpha$. This implies that $\alpha$ may be reduced to save significant transmit power while only resulting in a marginal error probability penalty. However, for very small values of $\alpha$, the error probability is, in contrast to the transmit power, very sensitive to $\alpha$. Thus, for very small values, the benefit of reduced transmit power is relatively insignificant whereas the error rate degradation becomes significant.

It has been found that advantageous performance can be achieved with values of $\alpha$ below 0.9 corresponding to the translation offset, combination replication offset and/or replication offset being such that the neighbour replication distance is 90% or less of the minimum distance between constellation points of the first constellation.

Indeed, it has been found that a particular significant average transmit power can be achieved for values of $\alpha$ of 50% or below and that error performance is not significantly affected for values of $\alpha$ of 20% or above. Accordingly, in many embodiments particularly advantageous performance is achieved for $0.2 \leq \alpha \leq 0.5$ with $0.3 \leq \alpha \leq 0.4$ typically resulting in a most advantageous trade-off between transmit power and error performance.

It will be appreciated that the described approach for receiving the data symbols may also be applied for $\alpha \neq 1$. In particular, the received symbol may still be transformed into a QPSK decoding symbol by applying the following functions:

$$p_r = \left[\frac{\Re(x)}{\tau} + \frac{1}{2}\right], p_i = \left[\frac{\Im(x)}{\tau} + \frac{1}{2}\right]$$

and $$\Re(z) = (-1)^{p_r*}(\Re(x) - p_r^*\tau), \Im(z) = (-1)^{p_i*}(\Im(x) - p_i^*\tau)$$

However, the replication offset $\tau$ must be modified to reflect the actual distance between replications of the first constellation. Specifically, for the illustrated examples, $\tau$ is set equal to $(1+\alpha)·d_{min}$.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims does not imply any specific order in which the features must be worked and in particular the order of individual steps in a method claim does not imply that the steps must be performed in this order. Rather, the steps may be performed in any suitable order.

The invention claimed is:

1. A method of transmitting data symbols, the method comprising:
providing a constellation pattern comprising replications of a combined constellation with different translations such that each replication has a combination replication offset relative to a neighbouring replication, the combined constellation comprising at least a first constellation, a second constellation with a first translation offset between the first constellation and the second constellation and the second constellation corresponding to an axis mirroring of the first constellation around at least one of a real axis and an imaginary axis, and a third constellation with a second translation offset between the first constellation and the third constellation being different from the first translation offset, the third constellation corresponding to an axis mirroring of the first constellation around the real axis and the imaginary axis not used for the first axis mirroring;
a channel symbol selector, for selecting symbols for transmission from the constellation pattern, the selection including for a data value corresponding to a first constellation point of the first constellation selecting a symbol from replications of the first constellation point in the constellation pattern to meet a criterion; and
transmitting the selected symbols.

2. The method of claim 1 wherein the method comprises:
providing the first constellation comprising constellation points;
generating the second constellation by applying a first axis mirroring to the first constellation, the first axis mirroring being a mirroring around at least one of the real axis and the imaginary axis;
generating the combined constellation comprising at least the first constellation, the second constellation with the first translation offset between the first constellation and the second constellation, and the third constellation with a second translation offset between the first constellation and the third constellation being different from the first translation offset; and
generating the constellation pattern comprising replications of the combined constellation with different translations such that each replication has a combination replication offset relative to the neighbouring replication.

3. The method of claim 1 wherein the first translation offset is such that a first distance between at least one corresponding constellation point of the first constellation and the second constellation is less than a second distance between a pair of constellation points of the first constellation having a minimum distance of the first constellation.

4. The method of claim 3 wherein the first distance is between 10% and 90% percent of the second distance.

5. The method of claim 3 wherein the first distance is between 50% and 70% percent of the second distance.

6. The method of claim 1 wherein the combination replication offsets are such that a first distance between at least two corresponding constellation points of neighbouring replications is less than a second distance between a pair of constellation points of the first constellation having a minimum distance of the first constellation.

7. The method of claim 6 wherein the first distance is less than 90% percent of the second distance.

8. The method of claim 6 wherein the first distance is between 20% and 50% percent of the second distance.

9. The method of claim 1 wherein the combined constellation further comprises a fourth constellation with a third translation offset between the first constellation and the third constellation being different from the first translation offset and the second translation offset, the fourth constellation corresponding to an axis mirroring of the first constellation around both the real axis and the imaginary axis.

10. The method of claim 1 wherein selecting symbols comprises selecting a plurality of symbols for parallel transmission from a plurality of antennas; and transmitting the selected symbols comprises simultaneously transmitting the plurality of symbols from the plurality of antennas.

11. A method of receiving data symbols comprising:
receiving, by a receive circuitry, a received symbol corresponding to a constellation point selected from corresponding constellation points of a constellation pattern comprising replications of a first constellation, each replication having a replication offset relative to a neighbouring replication and each replication alternating between corresponding to the first constellation and a constellation of a set of at least one axis mirrored constellation of the first constellation around at least one of the real axis and an imaginary axis;
folding the received symbol into a region corresponding to the first constellation to generate a decoding symbol; wherein the folding comprises for at least a first axis of the real and the imaginary axis,
determining an integer replication offset between the received symbol and the region corresponding to the first constellation for the first axis:
generating an offset symbol by offsetting the received symbol along the first axis by a value corresponding to the integer replication offset multiplied by the replication offset; and
performing an axis mirroring of the offset symbol around a second axis of the real and the imaginary axis not being the first axis if the integer replication offset is odd; and
determining a received data symbol value from the decoding symbol.

12. The method of claim 11 wherein the replication offset is such that a first distance between at least two corresponding constellation points of neighbouring replications is less than a second distance between a pair of constellation points of the first constellation having a minimum distance.

13. The method of claim 12 wherein the replication offset along the first axis is equal to a sum of the first distance along the first axis and a second distance along the first axis.

14. The method of claim 11 wherein determining the integer replication offset comprises determining the integer replication offset as an integer closest to a first axis received symbol value of the received symbol divided by a first axis replication offset along the first axis.

15. The method of claim 11 wherein determining the integer replication offset comprises compensating the first axis received symbol value for a constellation pattern offset prior to determining the integer replication offset.

16. A transmitter for transmitting data symbols, the method comprising:
a unit for providing a constellation pattern comprising replications of a combined constellation with different translations such that each replication has a combination replication offset relative to a neighbouring replication, the combined constellation comprising at least a first constellation, a second constellation with a first translation offset between the first constellation and the second constellation and the second constellation corresponding to an axis mirroring of the first constellation around at least one of a real axis and an imaginary axis, and a third constellation with a second translation offset between the first constellation and the third constellation being different from the first translation offset, the third constellation corresponding to an axis mirroring of the first constellation around the real axis and the imaginary axis not used for the first axis mirroring;

a channel symbol selector for selecting symbols for transmission from the constellation pattern, the selection including for a data value corresponding to a first constellation point of the first constellation selecting a symbol from replications of the first constellation point in the constellation pattern to meet a criterion; and a transmitter unit for transmitting the selected symbols.

17. A receiver for receiving data symbols comprising:

a receiving unit for receiving a received symbol corresponding to a constellation point selected from corresponding constellation points of a constellation pattern comprising replications of a first constellation, each replication having a replication offset relative to a neighbouring replication and each replication alternating between corresponding to the first constellation and a constellation of a set of at least one axis mirrored constellation of the first constellation around at least one of the real axis and an imaginary axis;

a processor for folding the received symbol into a region corresponding to the first constellation to generate a decoding symbol; wherein the folding comprises for at least a first axis of the real and the imaginary axis, determining an integer replication offset between the received symbol and the region corresponding to the first constellation for the first axis;

generating an offset symbol by offsetting the received symbol along the first axis by a value corresponding to the integer replication offset multiplied by the replication offset; and performing an axis mirroring of the offset symbol around a second axis of the real and the imaginary axis not being the first axis if the integer replication offset is odd; and a decision unit for determining a received data symbol value from the decoding symbol.

\* \* \* \* \*